United States Patent
Gillespie

(10) Patent No.: US 7,921,247 B1
(45) Date of Patent: Apr. 5, 2011

(54) SHARING A DYNAMICALLY LOCATED MEMORY BLOCK BETWEEN COMPONENTS EXECUTING IN DIFFERENT PROCESSOR MODES IN AN EXTENSIBLE FIRMWARE INTERFACE ENVIRONMENT

(75) Inventor: Kurt Gillespie, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 12/388,559

(22) Filed: Feb. 19, 2009

Related U.S. Application Data

(63) Continuation of application No. 11/377,808, filed on Mar. 16, 2006, now Pat. No. 7,512,719.

(51) Int. Cl.
*G06F 3/00* (2006.01)
(52) U.S. Cl. .......................... 710/100; 713/1
(58) Field of Classification Search .................. 710/110, 710/10; 713/1, 2; 711/118, 147, 130; 709/222
See application file for complete search history.

(56) References Cited

U.S. PATENT DOCUMENTS

| | | |
|---|---|---|
| 7,007,159 B2 | 2/2006 | Wyatt |
| 7,082,523 B2 | 7/2006 | Zimmer et al. |
| 7,103,766 B2 | 9/2006 | Cepulis et al. |
| 2006/0005002 A1 | 1/2006 | Zimmer et al. |

OTHER PUBLICATIONS

U.S. Official Action dated Sep. 3, 2008 in U.S. Appl. No. 11/377,808.
U.S. Notice of Allowance / Allowability dated Dec. 3, 2008 in U.S. Appl. No. 11/377,808.

*Primary Examiner* — Clifford H Knoll
(74) *Attorney, Agent, or Firm* — Hope Baldauff Hartman, LLC

(57) ABSTRACT

A block of memory is allocated from a volatile memory device, such as a main system random access memory. The memory block is allocated dynamically and has a dynamically assigned memory address. The memory address of the memory block is shared between a master component executing within an EFI environment and one or more slave components executing within the same and/or different processing modes, such as a system management mode. The memory address is used by the master component to access the memory block and also used by the slave components to access the memory block.

18 Claims, 7 Drawing Sheets

SHARING A DYNAMICALLY LOCATED MEMORY BLOCK BETWEEN COMPONENTS EXECUTING IN DIFFERENT PROCESSOR MODES IN AN EXTENSIBLE FIRMWARE INTERFACE ENVIRONMENT

CROSS-REFERENCE TO RELATED APPLICATIONS

This application is a continuation of U.S. patent application Ser. No. 11/377,808, filed Mar. 16, 2006, now U.S. Pat. No. 7,512,719, issued Mar. 31, 2009, entitled "Sharing a Dynamically Located Memory Block Between Components Executing in Different Processor Modes in an Extensible Firmware Interface Environment," and which is expressly incorporated herein by reference in its entirety.

BACKGROUND

Computing systems often use a non-volatile memory device, such as a non-volatile random access memory ("NVRAM") device, to store the system firmware. In some systems, the same NVRAM device is also utilized to store system configuration data. In systems that utilize a basic input/output system ("BIOS") the information stored in such devices is typically information that is not accessed or modified frequently. This is generally the result of the relatively slow access times of non-volatile memory devices and of the small storage capacity of typical NVRAM devices.

With the advent and proliferation of computer systems having firmware designed around the Extensible Firmware Interface ("EFI") specification from INTEL CORPORATION, however, it is much more common to utilize a non-volatile memory device to store data that is accessed and modified more frequently. As an example, an NVRAM device may be utilized by an EFI implementation to store an event log that includes records describing events that have occurred within the computer. Because events may occur more or less frequently, and possibly at any time while the computer is powered on, it may become necessary to read and write the non-volatile memory very frequently. However, because non-volatile memory is a relatively slow type of memory device, this type of frequent access can seriously impact performance.

In order to speed up read operations from a non-volatile memory device, a copy of all or a portion of the non-volatile memory may be kept in faster but volatile system memory. Read operations can then be performed on the copy, resulting in a faster return of desired data. For instance, a copy of an event log stored in the NVRAM may be kept in a typically faster system memory block, and read operations may be performed on the copy rather than on the slower NVRAM device. The copy of the contents of all or a portion of a slower storage device that is stored in and accessed from a faster storage device may be referred to herein as a "local copy."

While caching all or a desired portion of an NVRAM device in faster system memory speeds up read operations, it may also create other problems. In particular, in order to read from the local copy, each software component that wants to access the local copy must have the memory address of the local copy located in volatile system memory. If the local copy is to be accessed by multiple software components, each component must obtain the memory address of the local copy in some way. If the local copy is located at a predefined fixed memory address, each software component can easily be provided the predefined fixed memory address of the local copy. For all cases described herein, though, the local copy location is not predefined.

If the memory utilized for storing the local copy is allocated dynamically, the memory address of the local copy will also be dynamic. In this case it can be difficult to provide each software component that desires to access the local copy with the newly designated memory address of the dynamically allocated local copy. This can be especially difficult where the software components that need access to the local copy are executing in different processor modes. For instance, if one software component is executing in the system management mode ("SMM"), it can be very difficult for the component to properly locate, or be passed, the information about the dynamically allocated local copy that was allocated by a component operating in protected mode.

It is with respect to these and other considerations that the various embodiments disclosed herein are presented.

SUMMARY

In accordance with embodiments presented herein, the above and other problems are addressed by technologies for sharing a dynamically located memory block between multiple software components executing in multiple processor modes implemented in an EFI environment. Through the embodiments presented herein, software components executing in a collection of identical or different processor modes, such as protected mode and system management mode, can each locate the memory address of a local copy of all or a desired portion of a non-volatile memory device stored in faster volatile system memory.

According to one aspect, a method is provided for sharing a dynamically located memory block. According to the method, a block of memory, referred to herein as the "local copy", is allocated by a component from a volatile memory device, such as a main system random access memory ("RAM"). The local copy is allocated dynamically and has no pre-defined memory address. The memory address of the local copy is shared between a master component, the component who allocated the local copy's memory block, executing within an EFI environment, and one or more slave components, components that wish to use the local copy but do not allocate the space, executing within the same processor mode or another processor mode, such as the SMM mode utilized on processors from INTEL CORPORATION and AMD CORPORATION. The memory address of the local copy is used by the master component for access and also used by the slave components for access.

According to other aspects, the local copy may be utilized to store all or a portion of the contents of a non-volatile memory device, such as an NVRAM. The master and slave components can then use the memory address of the local copy to read the stored contents of the non-volatile memory device in a manner that is faster than reading directly from the non-volatile memory device. In the event any master or slave components must write to the non-volatile memory device, the components perform the write operation on both the local copy and on the appropriate portion of the non-volatile memory device. In this manner, the contents of the local copy of the non-volatile memory device and the contents of the mirrored part of the non-volatile memory device are simultaneously updated and are at all times, outside of the writing and erasing procedures, identical.

According to another aspect of the embodiment wherein the master component is launched before any slave components, the memory address of the local copy is shared by the master component by placing the memory address into an instance of an EFI protocol. A protocol is defined as a data structure with function pointers and data members. An instance of a protocol refers to the implementation of a protocol, which means an instance of the protocol data structure with correctly instantiated members (data and function pointers). Once the memory address of the local copy has been placed into an appropriate protocol, the slave components can retrieve the memory address from the protocol and utilize the memory address to access the local copy.

According to another aspect of the embodiment wherein slave components are launched before the master component, the slave component creates a new EFI protocol. The slave component then stores the memory address of a pointer variable that it desires to point to the local copy into the new protocol. The master component, launching later and allocating the local copy, retrieves the memory addresses of all of the pointer variables from the protocols installed by the slave components. The master component then uses the memory addresses to store the memory address of the local copy in the desired locations the slave components specified. The slave components can then recognize, during their next desired execution, that a valid memory address has been provided and operations are now valid in accessing the local copy.

Aspects of the disclosure presented herein may also be implemented as a computer process, a computing system, or as an article of manufacture such as a computer program product or computer-readable medium. The computer program product may be a computer storage media readable by a computer system and encoding a computer program of instructions for executing a computer process.

These and various other features as well as advantages, which characterize the embodiments disclosed herein, will be apparent from a reading of the following detailed description and a review of the associated drawings.

DETAILED DESCRIPTION

Figure 1:
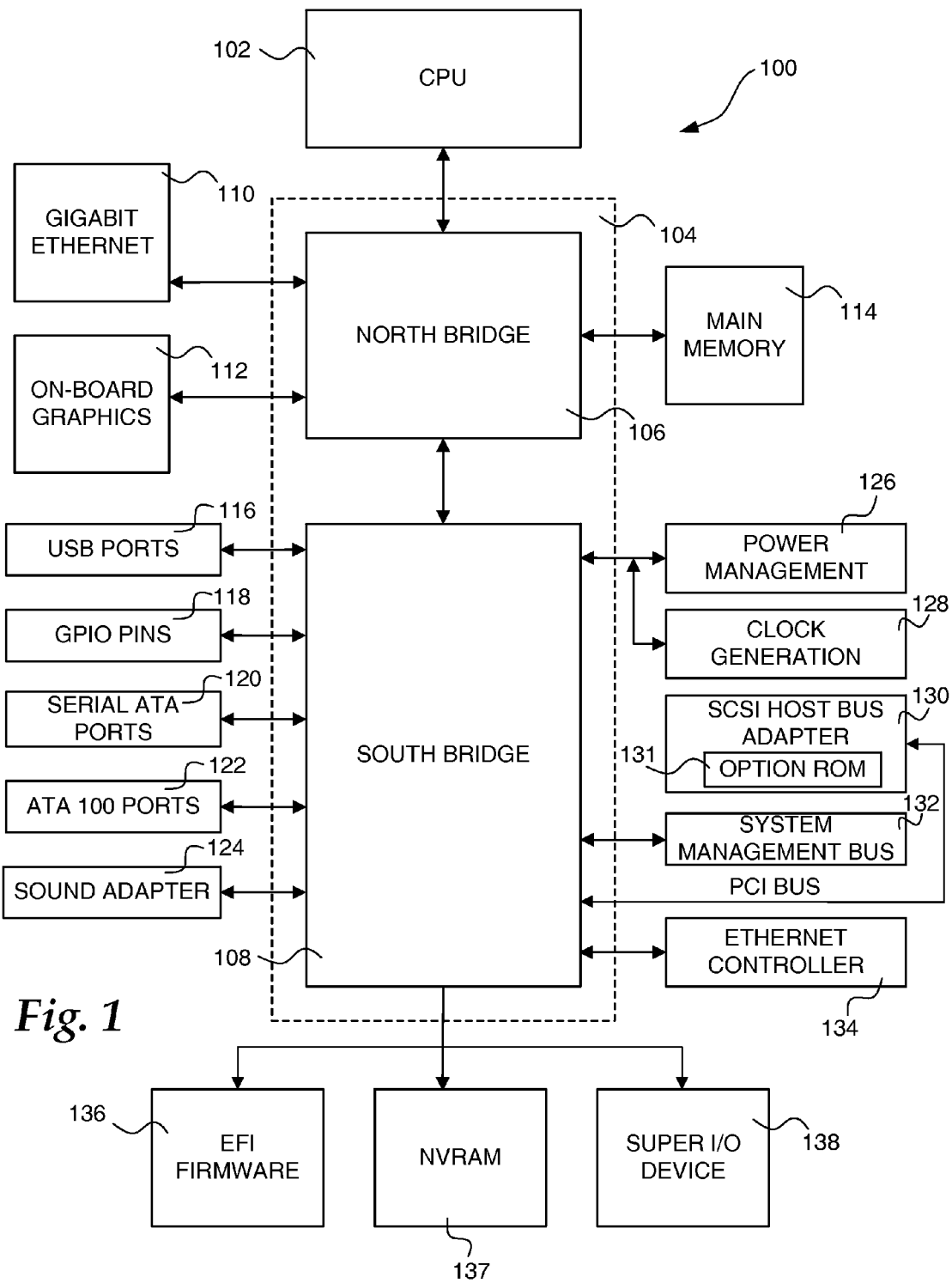
FIG. 1 is a computer architecture diagram that illustrates various components of a computer that provides an illustrative operating environment.

Embodiments disclosed herein include technologies for sharing a dynamically located memory block between multiple software components executing in multiple processor modes implemented in an Extensive Firmware Interface ("EFI") environment. In the following detailed description, references are made to the accompanying drawings that form a part hereof, and in which are shown by way of illustration specific embodiments or examples. Referring now to the drawings, in which like numerals represent like elements throughout the several figures, aspects of one embodiment presented herein and an exemplary operating environment will be described.

FIG. 1 and the following discussion are intended to provide a brief, general description of a suitable computing environment in which the embodiments disclosed herein may be implemented. While the embodiments presented herein will be described in the general context of program modules that execute in conjunction with the execution of a computer firmware, those skilled in the art will recognize that these embodiments may also be implemented in combination with other program modules.

Generally, program modules include routines, programs, components, data structures, and other types of structures that perform particular tasks or implement particular abstract data types. Moreover, those skilled in the art will appreciate that the embodiments presented herein may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments disclosed herein will be described. It should be appreciated that although the embodiments described herein are discussed in the context of a conventional desktop or server computer, the embodiments presented herein may be utilized with virtually any type of computing device. FIG. 1 shows an illustrative computer architecture for a computer 100 that is operative to enable software components executing in a first processor execution mode, such as the protected mode of execution, to share a dynamically allocated and located memory block with software components executing in a second processor execution mode, such as a system management mode.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The Extensible Firmware Interface ("EFI") firmware 136 comprises a firmware that is compatible with the EFI specification. Additional details regarding the operation of the EFI firmware 136 are provided below with respect to FIGS. 2-3.

The LPC interface may also be utilized to connect a NVRAM 137 to the computer 100. In an embodiment, the NVRAM 137 may be utilized by the firmware 136 to store configuration data and other kinds of data for the computer 100. In particular, in one embodiment, the NVRAM 137 is utilized to store an event log for the computer 100. The event log is utilized by an event logger program to store data describing events that occur within the computer 100. The event log may contain entries describing the events such as the date and time the event occurred and other information identifying the event. Additional details regarding the contents and use of the event log stored in the NVRAM 137 will be provided below. It should be appreciated that the configuration and other data for the computer 100 may be stored on the same NVRAM device as the firmware 136.

According to an embodiment, the CPU 102 may comprise a general purpose microprocessor from INTEL CORPORATION. For instance, the CPU 102 may comprise a PENTIUM 4 or XEON microprocessor from INTEL CORPORATION. As known to those skilled in the art, such microprocessors support a system management mode ("SMM"). The SMM provides an alternative operating environment that can be used to monitor and manage various system resources for more efficient energy usage, to control system hardware, and/or to run proprietary code. The SMM computing mode was introduced by the INTEL CORPORATION in the 386SL processor. The SMM computing mode is also available in the PENTIUM 4, XEON, P6 family, PENTIUM, and INTEL 386 processors. SMM is also available in compatible microprocessors from other manufacturers.

SMM is a special-purpose operating mode for handling system-wide functions like power management, system hardware control, or proprietary OEM-designed code. It is intended only for use by system firmware, not by applications software or general-purpose system software. The main benefit of SMM is that it offers a distinct and easily isolated processor environment that operates transparently to the operating system or executive and software applications.

When SMM is invoked through a system management interrupt ("SMI"), the CPU 102 saves the current state of the processor (the processor's context), then switches to a separate operating environment contained in a special portion of the RAM 114 called the system management RAM ("SMRAM"). While in SMM, the CPU 102 executes SMI handler code to perform operations such as powering down unused disk drives or monitors, executing proprietary code, or placing the entire computer 100 in a suspended state. When the SMI handler has completed its operations, it executes a resume ("RSM") instruction. This instruction causes the CPU 102 to reload the saved context of the processor, switch back to protected or real mode, and resume executing the interrupted application or operating-system program or task.

The execution of the SMM computing mode is transparent to applications and operating systems. This transparency is guaranteed because the only way to enter SMM is by means of an SMI, because the processor executes SMM code in a separate address space (the SMRAM) that can be made inaccessible from the other operating modes, because the processor saves the context of the interrupted program upon entering SMM, because all interrupts normally handled by the operating system are disabled upon entry into SMM, and because the RSM instruction can only be executed in SMM. Additional details regarding the operation of the SMM computing mode are provided in documentation available from INTEL CORPORATION and are well known to those skilled in the art. It should also be appreciated that the CPU 102 has other distinct execution modes, such as the real mode and the protected mode. Additional details regarding the processes utilized by the components executing in these modes is provided in greater detail below.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
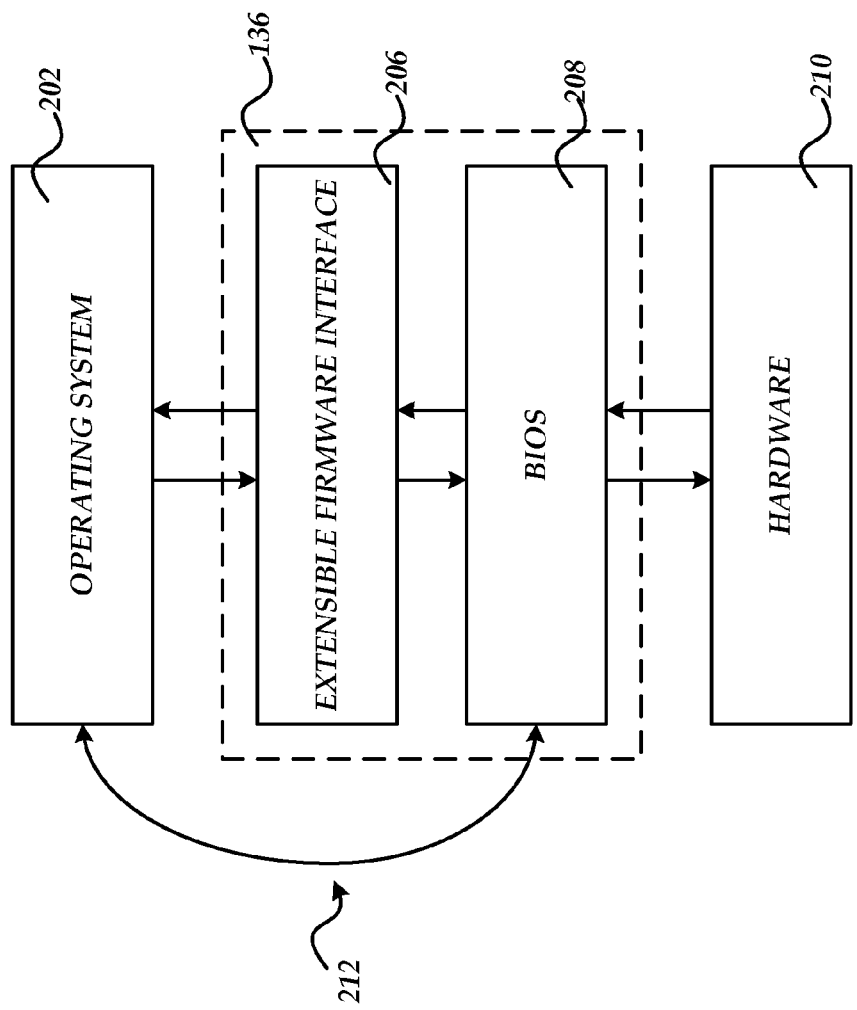
FIGS. 2 and 3 are computer architecture diagrams that illustrate aspects of an EFI environment utilized by the embodiments presented herein.

Referring now to FIG. 2, additional details regarding the operation of the EFI firmware 136 of the computer 100 will be described. In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The specification is called the Extensible Firmware Interface specification and is available from INTEL CORPORATION. The original EFI specification from INTEL CORPORATION is also being extended by the UNIFIED EXTENSIBLE FIRMWARE INTERFACE FORUM ("UEFI").

The EFI specification describes an interface between the operating system and the system firmware. In particular, the specifications define the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others.

As described above, the firmware 136 comprises a firmware compatible with the EFI specification from INTEL CORPORATION or from the UEFI FORUM. The EFI specification describes an interface between the operating system 202 and the system firmware 136. The EFI specification defines the interface that platform firmware must implement, and the interface that the operating system 202 may use in booting. How the firmware 136 implements the interface is left up to the manufacturer of the firmware. The intent of the specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a BIOS 208 may be present in the firmware 136. This allows users and system integrators to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI specification which is available from INTEL CORPORATION and expressly incorporated herein by reference.

As will be described in greater detail below, EFI also provides an EFI environment that executes within the SMM mode described above. The "mini-EFI" that executes within the SMM is utilized to provide EFI-like functionality for programs executing within the SMM. Programs executing within the mini-EFI in SMM may have access to the functions and data utilized by the EFI 206. Additional details regarding the mini-EFI utilized in SMM and the programs that execute within it will be provided below.

Figure 3:
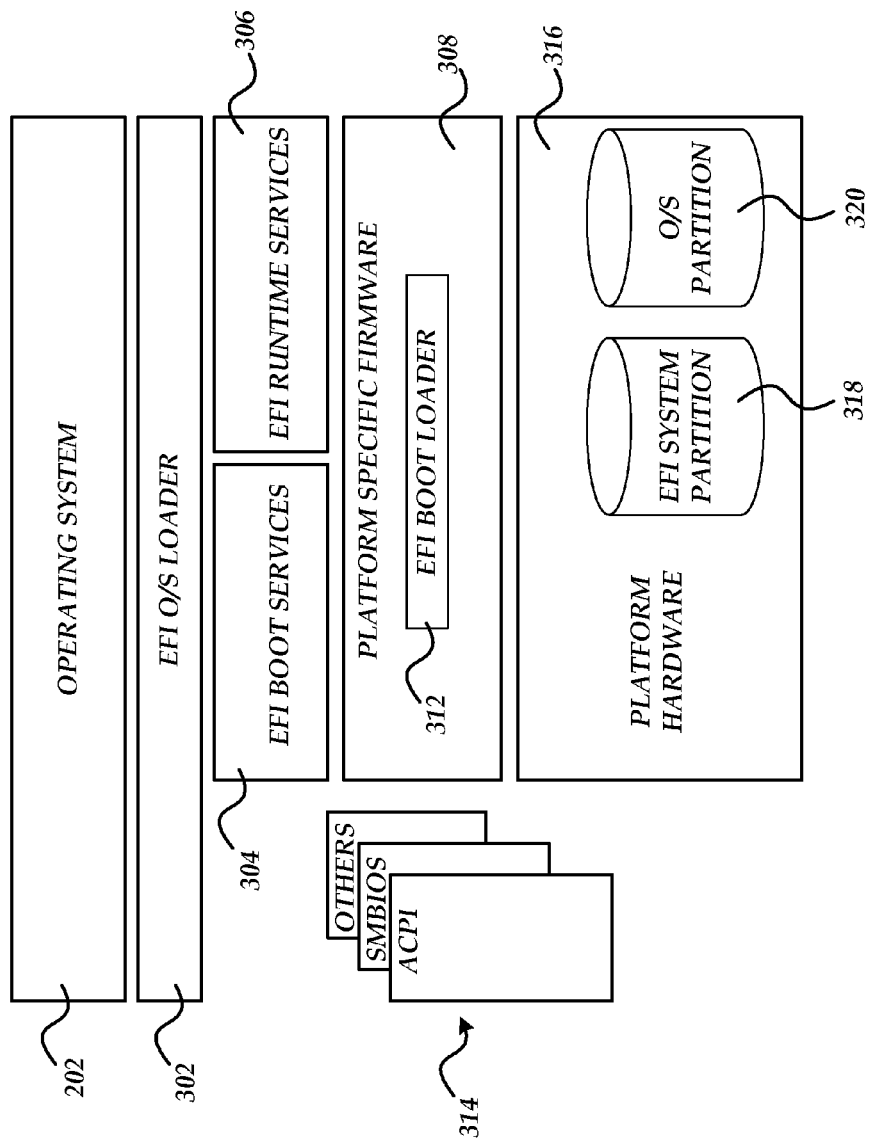

Turning now to FIG. 3, additional details regarding an EFI specification-compliant system utilized to provide an operating environment for the various embodiments presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4:
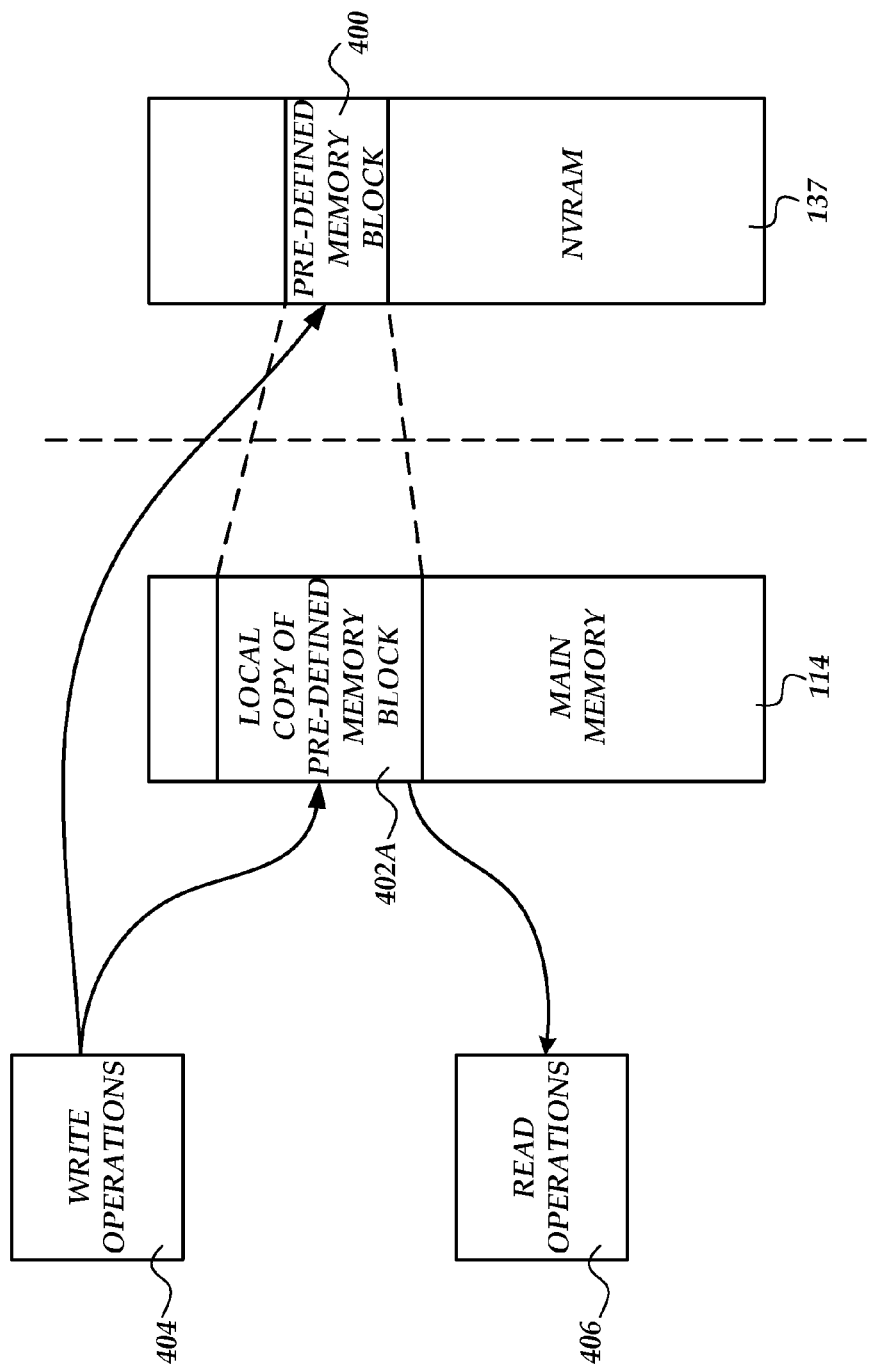
FIG. 4 is a block diagram illustrating aspects of one embodiment for reading and writing to a non-volatile memory device and a local copy of all or a portion of the non-volatile memory device.

Referring now to FIG. 4, additional details will be provided regarding the embodiments presented herein for sharing a dynamically located memory block between software components executing in different processor execution modes. In particular, FIG. 4 is a block diagram illustrating aspects of the disclosure presented herein for reading and writing to a non-volatile memory device and a local copy of all or a portion of the non-volatile memory device. As shown in FIG. 4 and briefly described above, the NVRAM 137 may be utilized to store an event log in a pre-defined non-volatile memory block 400. The event log, located in the pre-defined non-volatile memory block 400, is managed by an event logger program to store data describing events that occur within the computer 100. The event log may contain entries describing the events such as the date and time the event occurred and other information identifying the event.

In order to speed up access to the non-volatile memory block 400, a local copy 402A of the non-volatile memory block 400 is created in the main memory 114 of the computer 100. When programs, such as the event logger program, perform read operations 406 directed to the non-volatile memory block 400, the read operations 406 are performed on the identical local copy 402A of the non-volatile memory block 400 rather than on the actual data stored in the NVRAM 137. This provides faster read access to the contents of the non-volatile memory block 400. When programs, such as the event logger, perform write operations 404 and erase operations on the event log in the non-volatile memory block 400, these operations are immediately applied to both the non-volatile memory block 400 in the NVRAM 137 and the local copy 402A in the main memory 114. This ensures that the contents of the non-volatile memory block 400 and the local copy 402A are synchronized. This also ensures that a system failure after which point a write or erase was requested does not affect the state of whether the data was recorded or not into non-volatile memory.

According to one embodiment, access to the memory block containing the local copy 402A is needed by a "dual mode" component. A dual mode component is a software component that executes in the main memory 114 during EFI's driver execution phase and also has the software component's image replicated to SMRAM for execution in SMM in a mini-EFI implementation. Dual mode functionality has been defined by INTEL CORPORATION and supported by extensions to the EFI specification.

Figure 5:
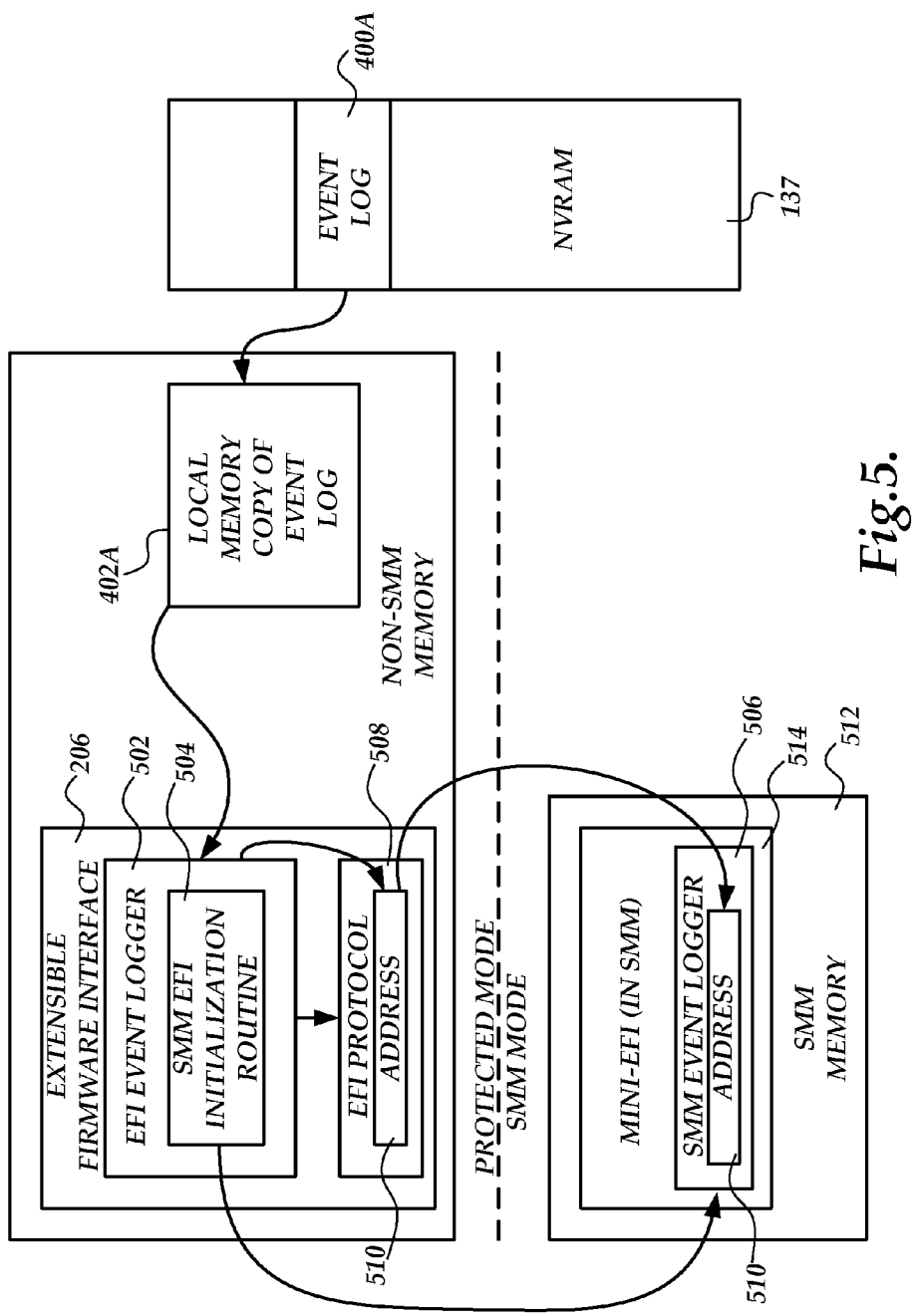
FIG. 5 is a block diagram illustrating a software architecture for sharing a dynamically allocated memory address of a memory block between a protected mode master component and a system management mode slave component according to one embodiment.
Figure 6:
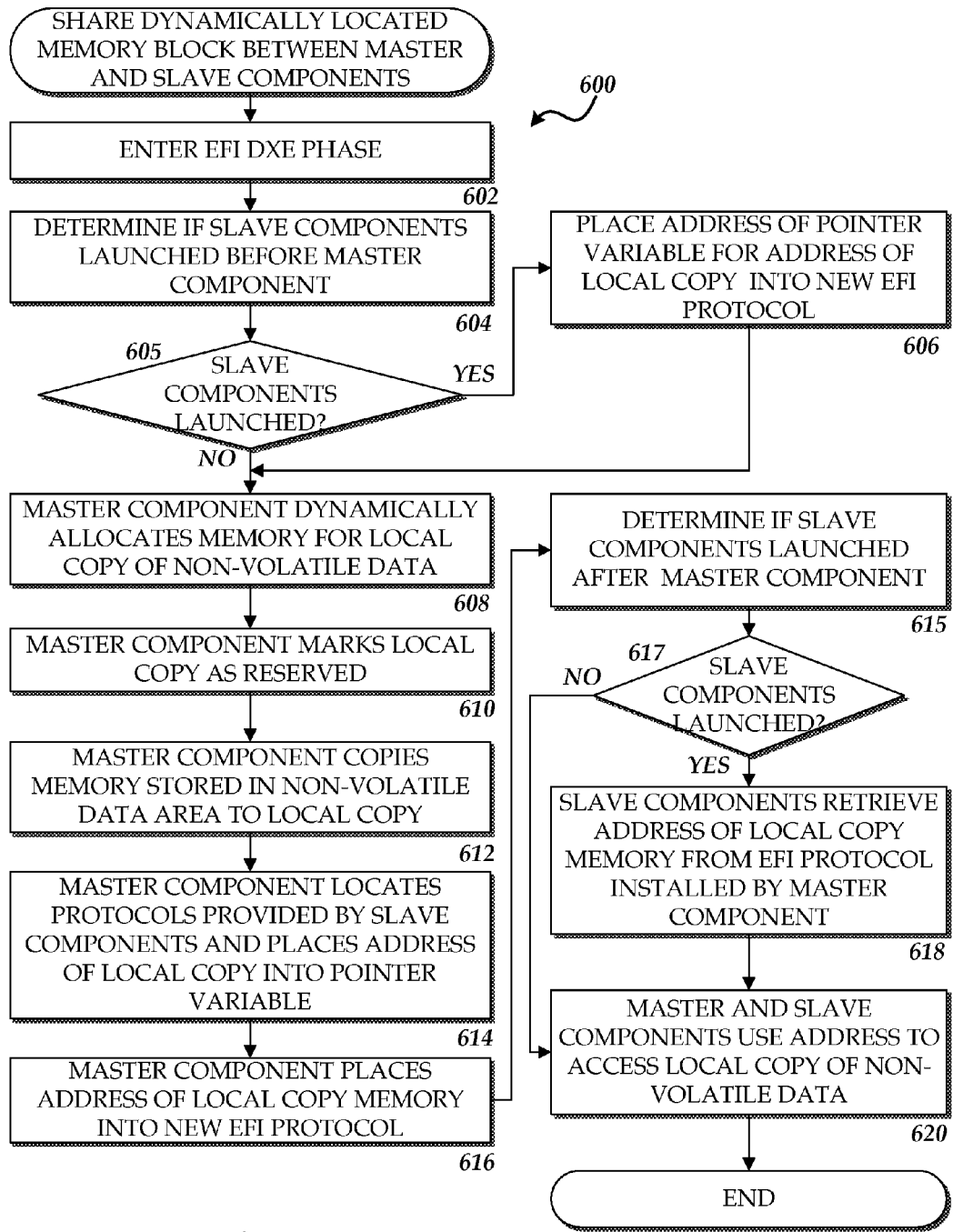
FIG. 6 is a flow diagram illustrating a process for sharing a dynamically allocated memory address of a memory block between a master component and a slave component according to one embodiment.
Figure 7:
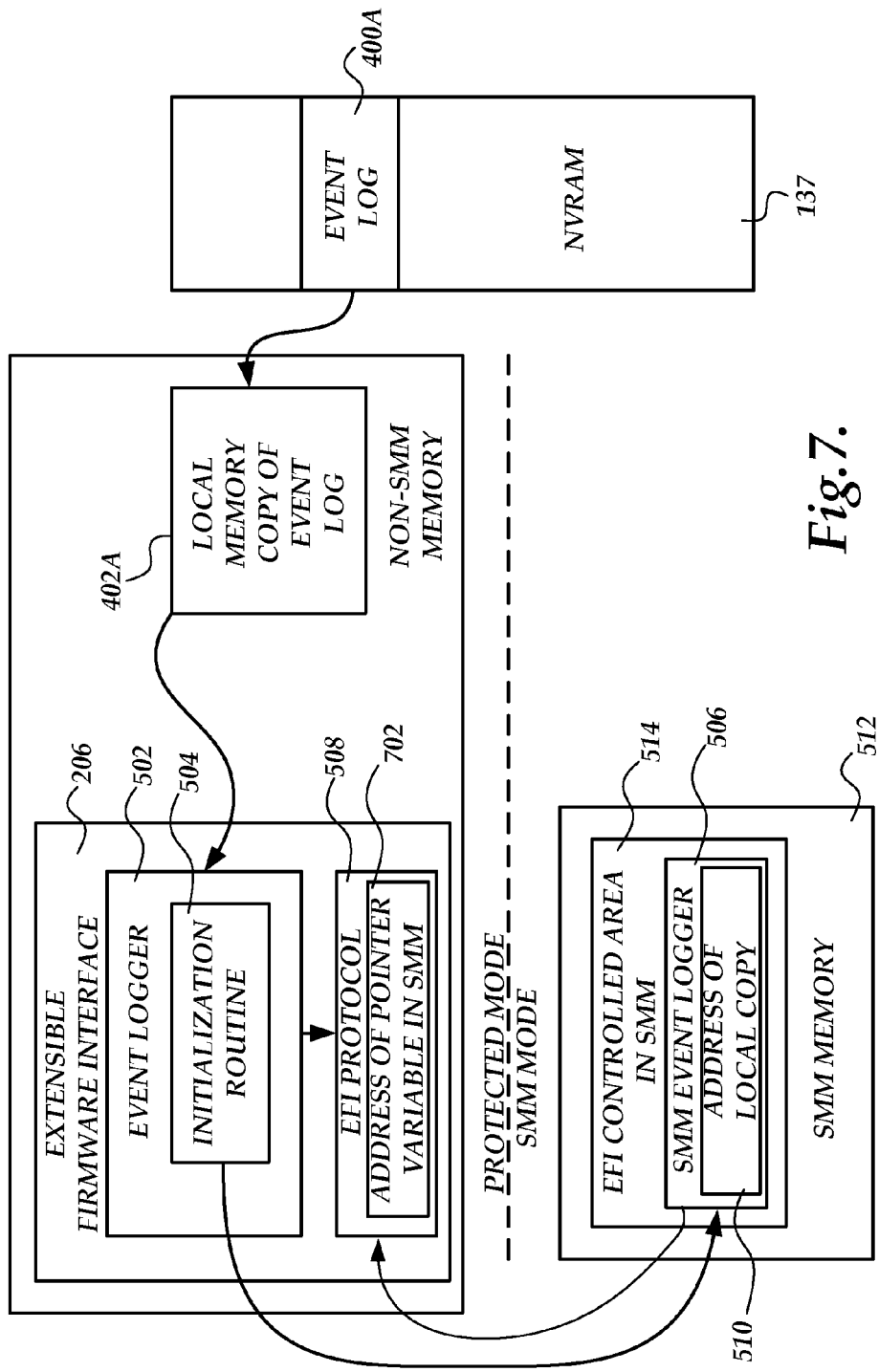
FIG. 7 is a block diagram illustrating a software architecture for sharing a dynamically allocated memory address of a memory block between a protected mode master component and a system management mode slave component according to another embodiment.

If the memory block that stores the local copy 402A is dynamically located, both the component executing within EFI and the component executing within the mini-EFI in SMM must know the address of the memory block to access the local copy 402A. Moreover, the SMM version of the component and the EFI DXE version of the component must utilize the same method to access the information stored in the non-volatile memory block 400 and the local copy 402A, or errors will arise by one component, which is unaware of the local copy, inserting information into the event log 400A that is not also reflected into the local copy 402A. FIGS. 5, 6, and 7 illustrate how, according to various embodiments, the memory address of a dynamically located memory block 402A, containing an identical copy of a non-volatile memory block 400, can be shared between a master component executing in EFI's DXE phase and multiple slave components executing in the same or different processor modes, such as in a mini-EFI implementation in SMM.

Turning now to FIG. 5, aspects of a process for sharing the memory address of a memory block containing a local copy of a portion of a non-volatile memory device will be provided. In particular, FIG. 5 is a block diagram illustrating a software architecture for sharing a dynamically allocated memory address of a memory block between a master component in EFI and a slave SMM component according to one embodiment. As shown in FIG. 5, the NVRAM 137 is utilized to store an event log 400A, which in this case is this one embodiment's predefined non-volatile memory block as FIG. 4 shows. The event log 400A is predefined and has a known size and location that is reserved during building of the EFI environment in the NVRAM 137. According to one embodiment, the event logger program is a dual mode software component. Accordingly, the event logger program consists of a master component, the EFI event logger 502, that executes within the CPU 102 protected mode in the EFI 206, and a slave component, the SMM event logger 506, that executes within the CPU 102 SMM mode in the mini-EFI environment 514.

According to one embodiment, the EFI event logger 502 dynamically allocates a memory block 402A from the volatile main system memory of the computer 100 to store a copy of all information located in the event log 400A. The EFI event logger 502 also initializes the contents of the event log 400A or copies the existing contents of the event log 400A into the local copy 402A as necessary. The EFI event logger 502 is also responsible for launching the SMM event logger 506 through the use of the SMM EFI initialization routine 504.

In order to share the memory address of the local copy 402A between the EFI event logger 502 and the SMM event logger 506, the EFI event logger 502 creates an EFI protocol 508 for storing the memory address 510 of the local copy 402A prior to entering the SMM EFI initialization routine 504. A protocol is defined as a data structure with function pointers and data members. An instance of a protocol refers to the implementation of a protocol, which means an instance of the protocol data structure with correctly instantiated members (data and function pointers).

Once the memory address 510 has been placed into the protocol 508 by the EFI event logger 502, the SMM event logger 506 can retrieve the memory address 510 from the protocol 508 and utilize the memory address to access the local copy 402A. The SMM event logger 506 is able to find protocols located in protected mode EFI 206 because of information made available to the mini-EFI in SMM 514 during its creation by the protected mode EFI 206. Though the rules of SMM, all physical memory, including all memory locating EFI 206 and contained data and code, is available for direct access by code executing in SMM memory 512. Both the EFI event logger 502 and the SMM event logger 506 can now access the local copy 402A in the manner described above with respect to FIG. 4.

It should be appreciated that following the loading of an operation system 202, the computer 100 may unload all or a portion of the EFI 206. However, because the SMM event logger 506 has the memory address of the memory block containing the local copy 402A, the SMM event logger 506 can continue to access the local copy 402A even after EFI has been unloaded. As will be described in greater detail below with respect to FIG. 6, the memory block containing the local copy 402A is reserved so that it is not relocated, overwritten, or unloaded at any point after the master component reserves the memory area 402.

Referring now to FIG. 6, an illustrative routine 600 will be described in detail for sharing a dynamically located memory block between a master software component executing in EFI's DXE phase and other slave components. The logical operations of the various embodiments disclosed herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the technologies presented herein. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the EFI 206 begins executing its driver execution environment ("DXE"). As a part of the DXE execution, slave components that desire to know the location of the local copy 402A but are not involved with reserving its memory area, may be launched before the master component that reserves and initializes the local copy 402A. Accordingly, a determination is made at operation 604 as to whether any slave components were launched before the master component. If so, the routine 600 branches from operation 605 to operation 606, where each of those slave components creates a new protocol and places into it the memory address of the pointer variable that it desires to have the memory address of the local copy 402A. Operation 606 may, or may not, be executed by any number of slave components.

From operation 606, the routine 600 continues to operation 608, where the EFI event logger 502 is initialized and dynamically allocates memory in the main memory 114 for the local copy 402A. The size and location of the memory block allocated for storing the local copy 402A are allocated dynamically by the EFI event logger. The memory block also has a memory address that identifies the location of the local copy 402A to any slave component that is passed this information, as is described in detail below.

From operation 608, the routine 600 continues to operation 610, where the master component marks the area dynamically allocated for the local copy 402A in such a way as to keep its location and survival static during all stages of the operation of the computer 100 from this point forward, providing that other programs and modules obey the universal specifications that were used to reserve the local copy 402A in this way, such as ACPI 314.

At operation 612, the master component copies the data and/or code stored in the event log 400A to the local copy 402A. This operation may also include verifying data structures or code inside the event log 400A and/or performing initialization routines on the event log 400A or the local copy 402A before or after the copying of the information, as designated by the specific implementation and use of the event log 400A.

From operation 612, the routine 600 continues to operation 614, where the master component searches for any protocols installed by slave components as described above at operation 606. For every protocol installed by a slave component, the master component will retrieve the memory address from inside the protocol, which points to a pointer variable, and using that address will fill the pointer variable with the memory address of the local copy 402A. This operation may involve specific activities needed in order to fill the pointer variable location provided by the protocol. In one embodiment, the slave component was from SMM and in order to place the memory address of the local copy 402A into the pointer variable, internal EFI functions were used to unlock the SMM memory, place the information, and lock the SMM memory back up. At operation 616, the EFI event logger 502 creates and installs an EFI protocol 508 holding the memory address 510 of the memory block containing the local copy 402A.

From operation 616, the routine 600 continues to operation 615, where a determination is made as to whether any slave components were launched after the master component. If not, the routine 600 branches from operation 617 to operation 620. If so, the routine 600 continues from operation 617 to operation 618. At operation 618, the slave components retrieve the address of the local copy 402A from the EFI protocol installed by the master component. The routine 600 then continues to operation 620.

At operation 620, both the slave components, like the SMM event logger 506, and the master component, like EFI event logger 502, use the memory address of the local copy to access the local copy 402A. This is performed in the manner described above with respect to FIG. 4. According to an embodiment, a function is provided that updates the contents of the non-volatile memory block 400 stored in the NVRAM 137 any time the contents of the local copy 402A and the copy in the NVRAM 137 are different after a master or slave component have finished writing to and/or erasing any part of the local copy 402A. In this manner, writes and erases are affected to both the local copy 402A and the non-volatile memory block 400 stored in the NVRAM 137, but also minimizes the amount of erasing and/or writing to the much slower NVRAM 137. Reads may be performed directly, and faster, from the local copy 402A. From operation 620, the routine 600 continues to operation 622, where it ends.

Referring now to FIG. 7, aspects of an alternate process for sharing the memory address of a memory block containing a local copy of a portion of a non-volatile memory device will be provided. In particular, FIG. 7 is a block diagram illustrating a software architecture for sharing a dynamically allocated memory address of a memory block between a master component in EFI and a slave SMM component according to another embodiment. As shown in FIG. 7, the NVRAM 137 is utilized to store an event log 400A, which in this case is the predefined non-volatile memory block as FIG. 4 shows. The event logger program is also a dual mode software component in this embodiment. Accordingly, in this embodiment, the event logger program consists of a master software component, the EFI event logger 502, that executes within the CPU 102 protected mode in the EFI 206, and a slave software component, the SMM event logger 506, that executes within the CPU 102 SMM mode in the mini-EFI environment 514.

According to this embodiment, the EFI event logger 502 dynamically allocates a memory block from the volatile main system memory of the computer 100 to store the local copy 402A. The EFI event logger 502 also initializes the contents of the event log 400A or copies the existing contents of the event log 400A into the local copy 402A as necessary. The EFI event logger 502, in this embodiment, is also responsible for installing the SMM event logger 506 through the use of the SMM EFI initialization routine 504.

In order to share the memory address of the local copy 402A between the EFI event logger 502 and the SMM event logger 506, the SMM event logger 506 creates a protocol 508 for storing the address 702 of SMM global variables. This is possible because the SMM runtime component, which is defined by the EFI specification, makes available the address of the EFI system tables present in the main memory 114 to the mini-EFI 514 that runs in SMM. Therefore, the SMM event logger 506 has access to all of the functions and information available to the EFI event logger 502. During the initialization phase, the SMM event logger 506 can create an implementation of a protocol 508 in non-SMM memory through the use of the EFI tables located in the non-SMM memory. The SMM event logger 506 places the address pointer variable 510 into the protocol's data variable 702.

Once the protocol 508 has been created by the SMM event logger 506 and the address 702 has been placed into the protocol 508, the EFI event logger 502 can retrieve the address 702. The EFI event logger 502 then unlocks the appropriate portion of the SMM memory and places the memory address of the local copy 402A into the SMM pointer variable 702 by using the address 510 in the protocol 508. At this time both the EFI event logger 502 and the SMM event logger 506 can access the local copy 402A in the manner described above with respect to FIG. 4 because they both know the address of the local copy 402A.

It should be appreciated that embodiments presented herein provide technologies for sharing a dynamically located memory block between a software component executing in a processor protected mode and other components executing in protected mode and SMM. It should be appreciated that although the disclosure presented herein has been made in the context of providing access to a memory block to a master component executing in an EFI environment and multiple other slave components executing in an EFI environment and an SMM environment, the embodiments presented herein may be utilized to provide access to a memory block to virtually any number of software components executing in different types of environments and processor modes. Moreover, although the disclosure made herein has been presented in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for sharing a dynamically located memory block, the method comprising:
    allocating the memory block from a volatile memory device, the memory block having a dynamically assigned memory address and location;
    sharing the memory address of the memory block between a master component executing in an extensible firmware interface environment and a slave component executing within a system management mode;
    using the memory address to access the memory block by way of the master component; and
    using the memory address to access the memory block by way of the slave component.

2. The method of claim 1, further comprising:
    storing in the memory block the contents of a portion of a non-volatile memory device; and
    wherein using the memory address to access the memory block by way of the master and slave components comprises using the memory address to read from the memory block the stored contents of the non-volatile memory.

3. The method of claim 2, wherein sharing the memory address of the memory block between a master component and slave components comprises:
    placing the memory address of the memory block into an extensible firmware interface protocol by way of the master component; and
    retrieving the memory address of the memory block from the extensible firmware interface protocol by way of the slave component.

4. The method of claim 1, wherein the master component comprises an extensible firmware interface (EFI) event logger.

5. The method of claim 1, wherein the slave component comprises a system management mode (SMM) event logger.

6. A computer storage media having computer-executable instructions stored thereon which, when executed by a computer, cause the computer to:
    allocate a memory block from a volatile memory device, the memory block having a dynamically assigned memory address and location;
    share the memory address of the memory block between a master component executing in an extensible firmware interface environment and a slave component executing within a system management mode;
    use the memory address to access the memory block by way of the master component; and to
    use the memory address to access the memory block by way of the slave component.

7. The computer storage media of claim 6, having further computer-executable instructions stored thereon which, when executed by the computer, cause the computer to:
    store in the memory block the contents of a portion of a non-volatile memory device, and wherein using the memory address to access the memory block by way of the master and slave components comprises using the memory address to read from the memory block the stored contents of the non-volatile memory.

8. The computer storage media of claim 7, wherein sharing the memory address of the memory block between a master component and slave components comprises:
    placing the memory address of the memory block into an extensible firmware interface protocol by way of the master component; and
    retrieving the memory address of the memory block from the extensible firmware interface protocol by way of the slave component.

9. The method of claim 6, wherein the master component comprises an extensible firmware interface (EFI) event logger.

10. The method of claim 6, wherein the slave component comprises a system management mode (SMM) event logger.

11. A method for providing access to a local memory copy of a portion of a non-volatile memory device to a master component and one or more slave components, the method comprising:
    reserving by the master component a dynamically sized and located portion of volatile memory for storing the local memory copy;
    copying the contents of the portion of the non-volatile memory device to the local memory copy;
    storing a memory address of the local memory copy in an extensible firmware interface protocol accessible by slave components;
    retrieving by the slave components the memory address of the local memory copy from the extensible firmware interface protocol;
    reading by the master component and slave components from the local memory copy using the memory address; and
    writing by the master component and slave components to the local memory copy and the portion of the memory device.

12. The method of claim 11, wherein the memory device is a non-volatile memory device.

13. The method of claim 12, wherein the size of the local memory copy is dynamic.

14. The method of claim 13, wherein the address of the local memory copy is dynamic.

15. The method of claim 14, wherein master component is executing in an extensible firmware interface environment.

16. The method of claim 15, wherein the slave components are executing within an extensible firmware interface or a system management mode environment.

17. The method of claim 11, wherein the master component comprises an extensible firmware interface (EFI) event logger.

18. The method of claim 11, wherein at least one of the slave components comprises a system management mode (SMM) event logger.

* * * * *